Jan. 2, 1968  R. GOTTLIEB  3,361,405
MOTOR DRIVEN SWING
Filed April 6, 1966  3 Sheets-Sheet 1
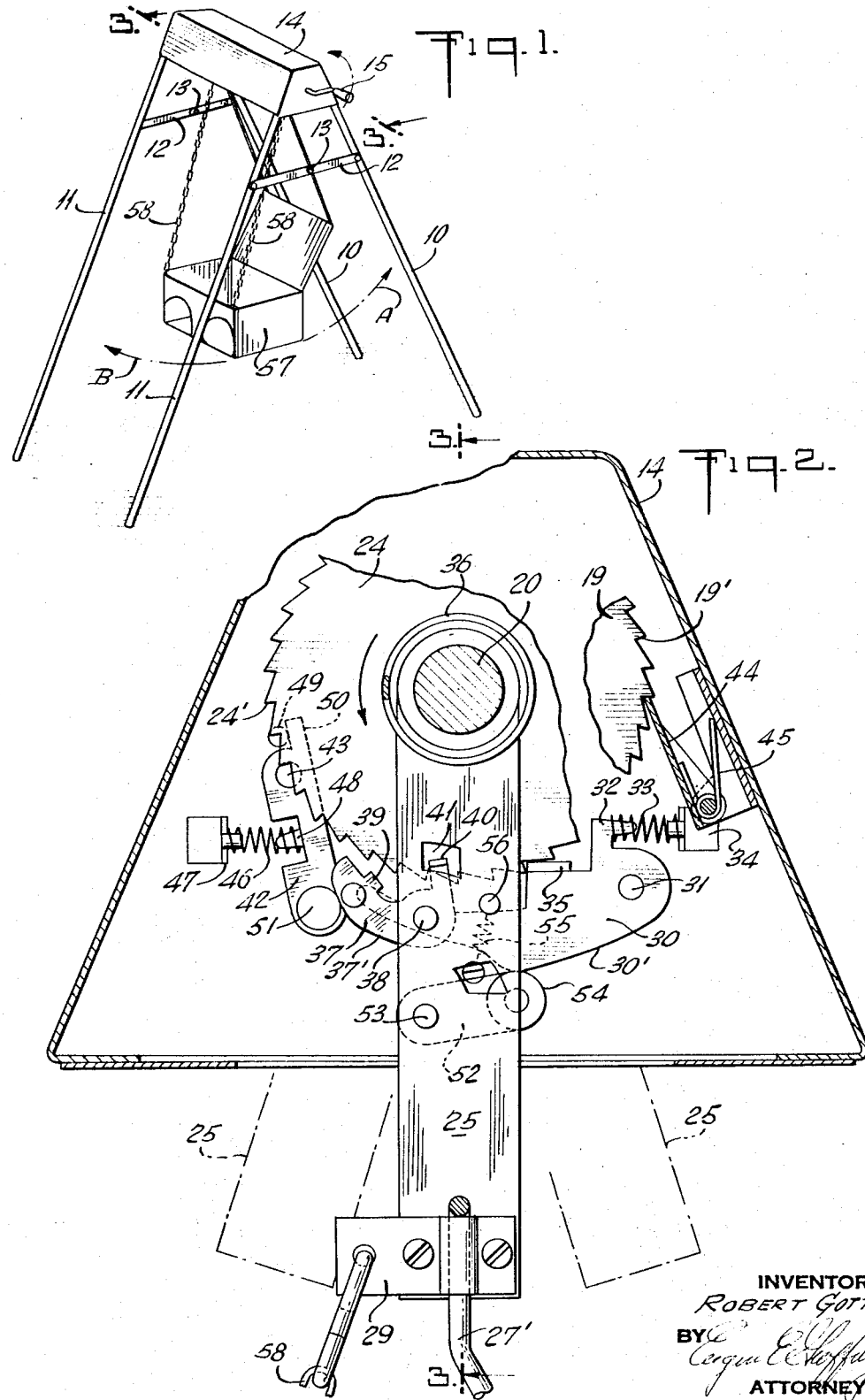
INVENTOR
ROBERT GOTTLIEB
BY
ATTORNEY Jan. 2, 1968     R. GOTTLIEB     3,361,405
MOTOR DRIVEN SWING
Filed April 6, 1966     3 Sheets-Sheet 2
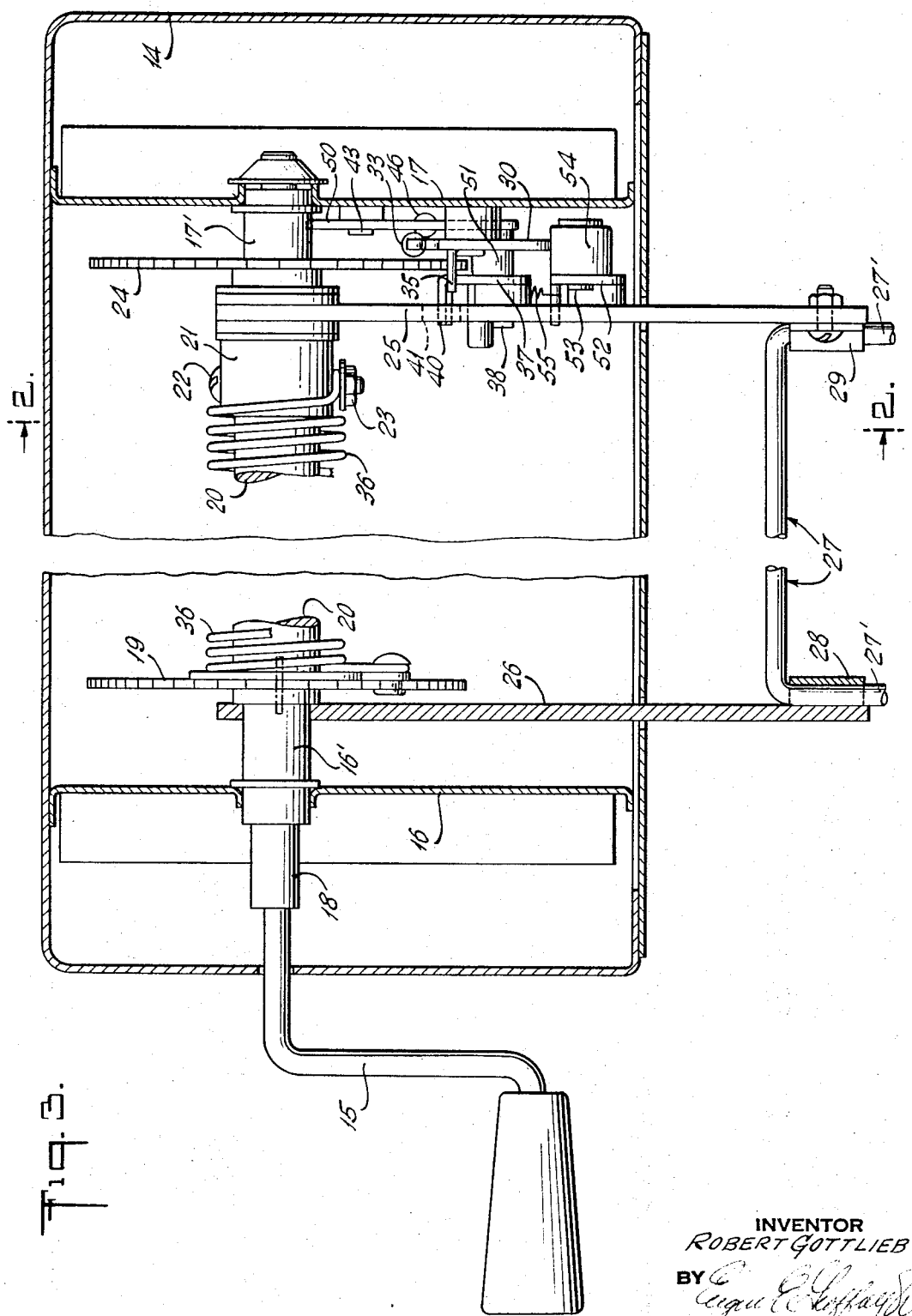
INVENTOR
ROBERT GOTTLIEB
BY
ATTORNEY

INVENTOR
ROBERT GOTTLIEB
BY
ATTORNEY

United States Patent Office 3,361,405
Patented Jan. 2, 1968

3,361,405
MOTOR DRIVEN SWING
Robert Gottlieb, 30—20 78th St.,
Jackson Heights, N.Y. 11372
Filed Apr. 6, 1966, Ser. No. 540,596
3 Claims. (Cl. 248—370)

This invention relates to motor driven swings and more specifically to a novel and improved spring actuated motor for operating swings, cradles, and the like for extended periods of time.

Numerous spring operated motors for rocking cribs and operating swings have been proposed, but known motors are relatively complicated, difficult to manufacture and often present some degree of danger occasioned by the failure of camming means to function properly and dependably. The invention overcomes the foregoing difficulties and provides a novel and improved motor that is characterized by its simplicity, dependability, and safety.

Another object of the invention resides in a novel and improved spring operated motor to effect periodic reciprocation of an arm for driving children's swings and other similar devices.

A still further object of the invention resides in a novel and improved spring operated motor.

The above and other objects of the invention will become more apparent from the following description and accompanying drawings forming part of the application.

In the drawings:

FIGURE 1 is a perspective view of an assembled child's swing in accordance with the invention.

FIGURE 2 is a cross sectional view of FIGURE 1 taken along the line 2—2 thereof.

FIGURE 3 is a cross sectional view of FIGURE 2 taken along the line 3—3 thereof.

Figure 4:
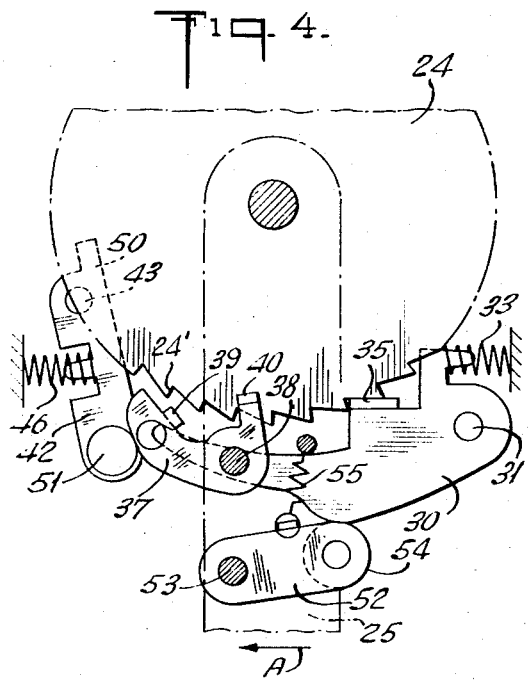
FIGURES 4 through 7 are side elevational views similar to FIGURE 3 and illustrating the sequence of operation of the camming mechanism of the motor.

The embodiment of the swing shown in FIGURE 1 includes a pair of spaced A frames, each formed of a pair of legs 10 and 11 and having cross braces 12, each of which includes two sections pivoted at 13 so that they may be folded upwardly to collapse the frames for storage. The hollow housing 14 is supported by the top ends of the two sets of legs 10 and 11 and houses the spring operated motor in accordance with the invention. A handle 15 extends from one end of the hollow housing 14 and is utilized to wind the spring motor in a manner to be described.

Referring now to FIGURES 2 and 3, the housing 14 includes a pair of vertical plates 16 and 17, provided with bearings 16' and 17' respectively and axially aligned one with the other. A shaft 18 threadably receiving the inner end of the handle 15 is rotatably mounted in the bearing 16' and carries a first ratchet wheel 19 which is fixedly secured thereto. The right hand end of the shaft 18 extends into one end and forms a bearing for an enlarged shaft 20. The other end of shaft 20 extends into a coupling 21 and is secured thereto by a bolt 22 and cooperating nut 23. The coupling 21 includes a second ratchet wheel 24 fixedly secured thereto and carries a downwardly extending swing driving member 25, the latter being adapted to swing through an arc independently of the movement of the coupling 21. A second swing supporting member 26 is pivotally carried by the bearing 16', and the two driving members are coupled by a U-shaped element 27 fastened to the lower ends of the driving members 25 and 26 by brackets 28 and 29, as shown more clearly in FIGURE 2.

The ratchet wheel 24 is normally held in a locked position by a pawl 30 pivoted at 31 to the plate 17. The upper portion of the pawl 30 as shown in FIGURE 2 carries an outwardly extending tab 32 which engages one end of a spring 33, the other end being fixed to an anchor 34 attached to the plate 17. This spring 33 tends to cause the cam 30 to rotate in a counter-clockwise direction. An offset tab 35 on the pawl 30 engages one of the teeth 24' in the ratchet 24 and the tendency of the ratchet to assert pressure in a counter-clockwise direction as shown in FIGURE 2 maintains the tab 35 of the pawl 30 in firm engagement with the ratchet 24 to prevent rotation.

With the pawl 30 in the position shown in FIGURE 2, the handle 15 may be rotated in a counter-clockwise direction to wind a spring 36 shown in FIGURE 2 tightly about the shaft 20. The spring 36 is fastened at its left hand end to the ratchet 19, while the right hand end is secured to the coupling 21. Thus, winding the spring will place substantial stress on the ratchet 24 and cause it to rotate in a counter-clockwise direction as shown in FIGURE 3 upon release of the pawl 30. A pawl 44 is urged against the ratchet wheel 19 by a spring 45 and engages successive teeth 19' during the rotation of the handle 15.

Power is transmitted from the ratchet 24 to the main driving arm 25 by means of a second pawl 37. The pawl 37 is pivoted at 38 to the main driving member 25 and includes an offset tab 39 which engages successive ratchet teeth 24' in the normal operation of the swing. A second offset tab 40 extends through an opening 41 in the driving arm 25 to limit the arcuate motion of the pawl 37 about the pivot 38.

The pawls 30 and 37 are operated by a pair of camming elements which function to automatically engage one pawl while releasing the other pawl and vice versa to impart oscillatory motion to the driving member 25.

More specifically, the cam 37 is operated by the lever 42 which is pivoted at 43. A spring 46 operating between an anchor 47 and an outwardly extending tab 48 on the lever 42 urges the lever in a counter-clockwise direction. The counter-clockwise rotation of the lever 42 is limited by a pin 49 engaging an upwardly extending tab 50. The lower end of the lever 42 carries a roller 51 which engages the outer edge 37' of the pawl 37.

A second pawl actuating lever 52 is pivoted at 53 to the driving member 25 and carries a roller 54 which rides on the outer surface 30' of the pawl 30. The lever 52 is biased upwardly by a spring 55 connected at one end to the lever and at the other end to a pin 56 also carried by the driving member 25.

Figure 5:
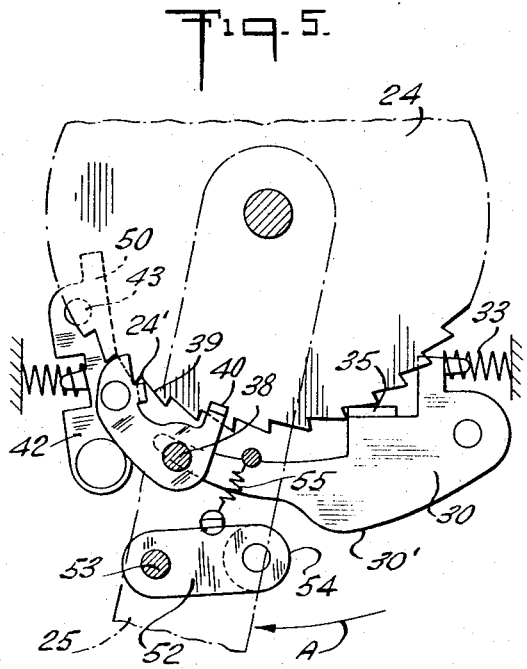
Figure 6:
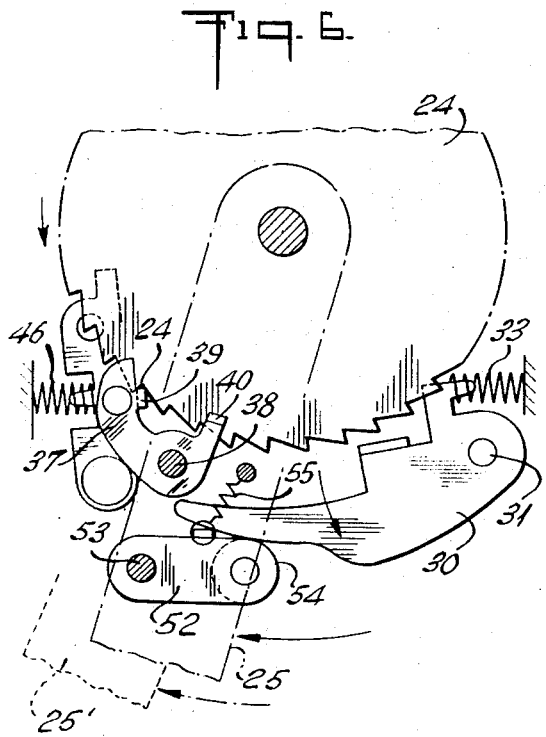
Figure 7:
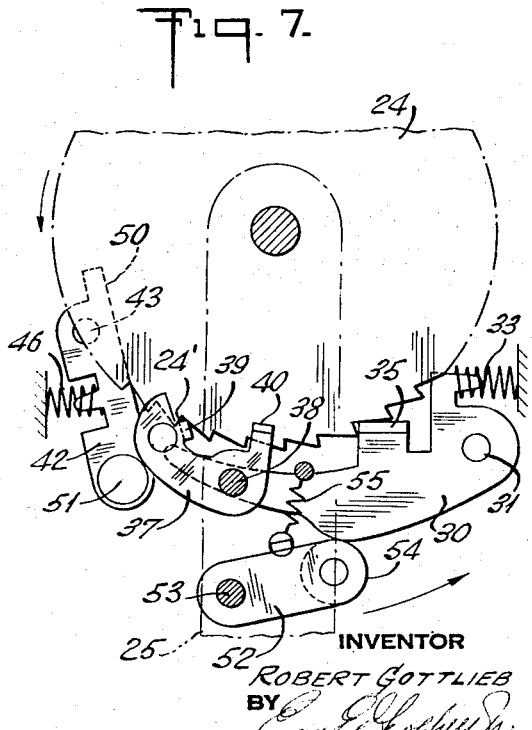

The operation of the spring operated motor is illustrated more clearly in FIGURES 4 through 7. FIGURE 4 is substantially identical to FIGURE 3, and for present purposes, let it be assumed that the driving member 25 is moving to the left as indicated by the arrow A by reason of the momentum of the weight of a child in the seat 57. This movement of the driving member 25 is in effect a free movement which occurs when the seat portion 57 of the swing is moving to the right as illustrtaed in FIGURE 1. The momentum of a child in the seat 57, once the swinging motion has been initiated, causes the driving member 25 to move in the direction of the arrow A with sufficient force to urge the tab 39 of the pawl 37 into engagement with one of the teeth 24'. This clockwise motion of the pawl 37 as viewed in FIGURE 4 is effected by the action of the lever 42 and the roller 51. Engagement of the tab 39 on the pawl 37 is shown in FIGURE 5, and it will also be observed that the tab 35 on the pawl 30 is still in engagement with one of the ratchet teeth 24'. Because of the momentum produced by the weight of a child in the seat 57, the driving member 25 will continue to move in the direction of the arrow A to a position 25' as shown in FIGURE 6 to permit the spring 33 to move the pawl 30 in a counter-clockwise direction and thus disengage the tab 35 from the ratchet wheel 24. This position of the arm 25 and the pawls 30 and 37 is shown in FIGURE 6. The moment the pawl 30 becomes disengaged from the ratchet wheel 24, the ratchet wheel 24 will rotate in a counter-clockwise direction and thereby move the driving member 25 to the right and impart energy to the seat 57 of the swing. When the member 25 has assumed a substantially vertical position as shown in FIGURE 7, the roller 54 on the lever 52 moves the pawl 30 in a clockwise direction against the action of the spring 33 and causes the tab 35 to engage a ratchet tooth 24'. As the arm 52 continues to swing to the right as shown in FIGURE 7 by reason of the momentum imparted by the seat 57, the pawl 37 will move free of the roller 51 carried by the lever 42, and gravity will cause it to rotate in a counter-clockwise direction and thereby move out of engagement with the ratchet 24. As soon as the seat 57 reaches the limit of its swing in the direction of the arrow B, it will start its return motion and the momentum produced by gravity will cause it to swing in the opposite direction until it reaches the maximum position indicated in dotted outline at 25', at which point pawl 37 is engaged with the ratchet wheel while the pawl 30 is disengaged to again impart energy to the swing. This action will continue until the main spring 36 has expended substantially all of its energy.

The seat 57 of the swing may be secured to the driving member 25 and its cooperating supporting member 26 in any suitable manner. In the illustrated embodiment of the invention, the rear portion of the seat 57 is supported by the U-shaped bracket 27, the downwardly extending leg portions 27' being attached to the rear portion of the seat 57. The front portion of the seat may be supported by chains 58 connected to forwardly extending portions 28' and 29' of the brackets 28 and 29. This will be seen more clearly in FIGURE 3.

While only one embodiment of the invention has been illustrated and described, it is apparent that alterations, modifications and changes may be made without departing from the true scope and spirit thereof as defined by the appended claims.

What is claimed is:

1. A spring operated motor for reciprocation of a driving member for operating devices such as swings, cradles, and the like, comprising a frame, a first ratchet wheel carried by said driving member and engaging said first frame and cooperating with said ratchet wheel to restrict rotation thereof in one direction, a second ratchet wheel pivotally carried by said frame and spaced from and axially aligned with the first ratchet wheel, a main spring having one end coupled to the first ratchet wheel and the other end coupled to the second ratchet wheel, means for rotating the first ratchet wheel to store power in said spring, a first control pawl pivoted to said frame and cooperating with said second ratchet wheel and movable into and out of engagement with the last said ratchet wheel, a spring associated with said first control pawl and operable to move it out of engagement with said second ratchet wheel, a driving arm adjoining said second ratchet wheel and pivoted for movement about the axis of said second ratchet wheel, a second control pawl pivoted to said driving arm and operable to move into and out of engagement with said second ratchet wheel, first camming means carried by said frame including spring means urging said camming means into contact with said second control pawl to move the last said pawl into engagement with said second ratchet wheel when said driving member moves to a predetermined position in one direction and moves out of engagement when said driving member moves in the other direction, and second camming means carried by said driving member and engaging said first control pawl to move it against the action of the associated spring into engagement with said second ratchet wheel upon movement of said driving member to a predetermined position in the other direction, said driving member being adapted to be coupled to a device for reciprocation thereof in a predetermined path whereby movement of said driving member in one direction effects engagement of said second control pawl with said second ratchet and release of the first control pawl to permit transmission of power from said main spring to said driving member during a portion of its movement in said other direction whereupon said second camming means effects engagement of said first control pawl with said second ratchet wheel and said second control pawl moves out of engagement with said first camming means and out of engagement with said second ratchet wheel, the periodic transmission of power thus imparted to said driving member effecting continued reciprocation of said driving member and of the device coupled thereto.

2. A spring operated motor according to claim 1 wherein said driving member extends downwardly from the axis of said ratchet wheel, and said motor includes a second idler member pivotally supported in spaced parallel relationship to said driving member and a swing supported by said driving and idler members.

3. A spring operated motor according to claim 2 wherein said motor is at least partially closed and secured within a housing and supported in an elevated position by two spaced sets of legs extending downwardly from said housing with said swing being disposed between said sets of legs.

References Cited
UNITED STATES PATENTS

| | | | |
|---|---|---|---|
| 3,071,339 | 1/1963 | Saint | 248—165 |
| 3,146,985 | 9/1964 | Grudoski | 248—370 |
| 3,166,287 | 1/1965 | Pasqua | 272—86 XR |

JOHN PETO, *Primary Examiner.*

J. F. FOSS, *Assistant Examiner.*